(12) United States Patent
Kang et al.

(10) Patent No.: US 9,174,184 B2
(45) Date of Patent: Nov. 3, 2015

(54) METHODS OF PRODUCING CARBONATE MINERALS AND APPARATUSES OF PRODUCING THE CARBONATE MINERALS

(71) Applicant: KOREA INSTITUTE OF GEOSCIENCE AND MINERAL RESOURCES, Daejeon (KR)

(72) Inventors: Il-Mo Kang, Seoul (KR); Se-Jung Chi, Seoul (KR); Yun-Goo Song, Seoul (KR); In-Joon Kim, Daejeon (KR); Gwang-Min Jin, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 89 days.

(21) Appl. No.: 14/172,010

(22) Filed: Feb. 4, 2014

(65) Prior Publication Data

US 2014/0147351 A1     May 29, 2014

Related U.S. Application Data

(62) Division of application No. 13/288,647, filed on Nov. 3, 2011, now Pat. No. 8,691,176.

(30) Foreign Application Priority Data

Sep. 14, 2011    (KR) ........................ 10-2011-0092331

(51) Int. Cl.
| | | |
|---|---|---|
| *B01J 19/24* | (2006.01) | |
| *C01F 5/24* | (2006.01) | |
| *C01F 11/18* | (2006.01) | |
| *B01J 10/00* | (2006.01) | |
| *B01J 19/00* | (2006.01) | |
| *B01J 8/20* | (2006.01) | |
| *B01D 53/34* | (2006.01) | |
| *B01D 53/46* | (2006.01) | |
| *B01D 53/62* | (2006.01) | |

(52) U.S. Cl.
CPC .............. *B01J 10/00* (2013.01); *B01J 19/2465* (2013.01); *C01F 5/24* (2013.01); *C01F 11/18* (2013.01); *C01P 2002/72* (2013.01); *C01P 2004/03* (2013.01)

(58) Field of Classification Search
CPC .............. B01J 8/00; B01J 10/00; B01J 19/00; B01J 19/0086; B01J 19/24; B01J 19/2455; B01J 19/2465; C01F 5/00; C01F 5/24; C01F 11/00; C01F 11/18
See application file for complete search history.

(56) References Cited

U.S. PATENT DOCUMENTS

| | | | | |
|---|---|---|---|---|
| 3,975,503 | A * | 8/1976 | Hauschild et al. ............ | 423/421 |
| 2009/0214408 | A1 * | 8/2009 | Blake et al. ................... | 423/232 |

* cited by examiner

*Primary Examiner* — Natasha Young
(74) *Attorney, Agent, or Firm* — Kile Park Reed & Houtteman PLLC

(57) ABSTRACT

An apparatus of producing a carbonate mineral includes a first reaction device including a fluid path along which an ion exchange solution moves; a cation exchange medium disposed in the fluid path, the cation exchange medium containing an alkaline earth metal; a second reaction device accommodating a sodium hydroxide aqueous solution and receiving the ion exchange solution containing an alkaline earth metal ion from the first reaction device; and a carbon dioxide supplying device supplying a carbon dioxide to the second aqueous solution.

13 Claims, 4 Drawing Sheets

METHODS OF PRODUCING CARBONATE MINERALS AND APPARATUSES OF PRODUCING THE CARBONATE MINERALS

CROSS-REFERENCE TO RELATED APPLICATIONS

This application is a divisional application of U.S. patent application Ser. No. 13/288,647, filed on Nov. 3, 2011 (currently pending), the disclosure of which is herein incorporated by reference in its entirety. The U.S. patent application Ser. No. 13/288,647 claims priority under 35 USC §119 to Korean Patent Application No. 10-2011-0092331 filed on Sep. 14, 2011, the contents of which are herein incorporated by reference in its entirety.

BACKGROUND OF THE INVENTION

1. Field of the Invention

Example embodiments of the present invention relate to methods of producing carbonate minerals and apparatuses of producing the carbonate minerals. More particularly, example embodiments of the present invention relate to methods of producing carbonate minerals for sequestering carbon dioxide and apparatuses of producing the carbonate minerals for performing the methods.

2. Description of the Related Art

Carbon dioxide is a typical greenhouse gas that is associated with global warming. The carbon dioxide is generally released when fossil fuel burns. The Kyoto Protocol on Global Warming requires reduction of the carbon dioxide.

Recently, for sequestering the carbon dioxide, the carbon dioxide may be injected into ocean repositories under the ground or may be sequestered by forming carbonate minerals using alkaline earth metal mineral and the carbon dioxide.

For injecting the carbon dioxide into the ocean repositories under the ground, a step of selecting a site into which the carbon dioxide is injected, a step of injecting the carbon dioxide into the selected site, and a step of monitoring the state after injecting the carbon dioxide are performed generally. The steps described above are very expensive and requires large scale equipments. In addition, the injection of the carbon dioxide into the ocean repositories requires long time for performing the steps described above. Therefore, the injection of the carbon dioxide into the ocean repositories may have a lot of economic constraints. Compared to the injection of the carbon dioxide into the ocean repositories, formation of the carbonate minerals for sequestering the carbon dioxide may be favorable economically, because equipments for forming the carbonate minerals can be fabricated in a small-to-medium scale and can be independently operated according to industrial settings.

SUMMARY OF THE INVENTION

Example embodiments of the present invention provide a method of producing a carbonate mineral for cheaply efficiently sequestering carbon dioxide.

Example embodiments of the present invention further provide an apparatus of producing the carbon dioxide for cheaply efficiently sequestering carbon dioxide.

According to one aspect of the present invention, there is provided a method of producing a carbonate mineral. In the method, a first aqueous solution containing an alkaline earth metal ion extracted from a cation exchange medium by a cation exchange reaction and carbon dioxide are added to a second aqueous solution to form a carbonate mineral. The cation exchange medium may include at least one of a clay mineral, a zeolite, an iron or manganese oxide, an iron or manganese hydroxide, and an organic ion exchange resin, which contain the alkaline earth metal.

The carbonate mineral may be separated from the second solution. The first aqueous solution may be prepared by exchanging the alkaline earth metal ion of the cation exchanged medium with sodium ions contained in an ion exchange solution. The ion exchange solution may include an aqueous solution containing the sodium ions and chloride ions. The second aqueous solution may include a sodium hydroxide aqueous solution, and the second aqueous solution from which the carbonate mineral has been separated may be used as the ion exchange solution.

According to one aspect of the present invention, there is provided an apparatus of producing a carbonate mineral. The apparatus may include a first reaction device, a cation exchange medium, a second reaction device, a carbon dioxide supplying device. The first reaction device may include a fluid path along which an ion exchange solution moves. The cation exchange medium may be disposed in the fluid path and may contain an alkaline earth metal. The second reaction device may accommodate a sodium hydroxide aqueous solution and may receive the ion exchange solution containing an alkaline earth metal ion from the first reaction device. The carbon dioxide supplying device may supply a carbon dioxide to the second aqueous solution.

The apparatus may further include a first container and a second rotation device. The first container may accommodate the ion exchange solution and may supply the ion exchange solution to the first reaction device. The solution rotation device may supply the aqueous solution accommodated in the second reaction device to the first container. The apparatus may further include a connection tube and a pump. The connection tube may connect the first container with the first reaction device. The pump may be combined with the connection tube and may transfer the ion exchange solution accommodated in the first container into the first reaction device.

According to example embodiments of the present invention, since the carbonate minerals are formed using the alkaline earth metal weakly combined to or absorbed onto an external surface of the mineral particle, a pore of the mineral particle, an interformational of the mineral particle, etc., energy for producing the carbonate minerals may be reduced and the carbon dioxide may be quickly converted into the carbonate minerals. Since the example embodiments of the present invention produce the carbonate minerals without dissolving a mineral particle used as the cation exchange medium, it may be prevented that the mineral particle used as the cation exchange medium is coated by the alkaline earth metal carbonate.

In addition, example embodiments of the present invention use the vermiculite, the smectite and the zeolite as the cation exchange medium. Although the vermiculite, the smectite and the zeolite are abundant, they hardly have industrial applications. Therefore, example embodiments of the present invention may make the industrial applications of the vermiculite, the smectite and the zeolite and may be capable of sequestering the carbon dioxide cheaply.

In addition, since example embodiments of the present invention extract the alkaline earth metal ion from the cation exchange medium without destroying the crystal structure of the cation exchange medium, the example embodiments of the present invention does not waste the mineral used as the cation exchange medium. Since example embodiments of the present invention form the carbonate minerals without addition of anions, example embodiments of the present invention may form pure carbonate minerals. The pure carbonate minerals may be used as raw materials of industry, such as paper coating materials, fire-proofing materials, etc.

In addition, the apparatus of producing the carbonate minerals in accordance to with example embodiments of the present invention is capable of being fabricated in a small-to-medium scale, the apparatus may be placed in industrial settings or houses to directly sequester the carbon dioxide generated in the industrial settings or the houses.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

Figure 1:
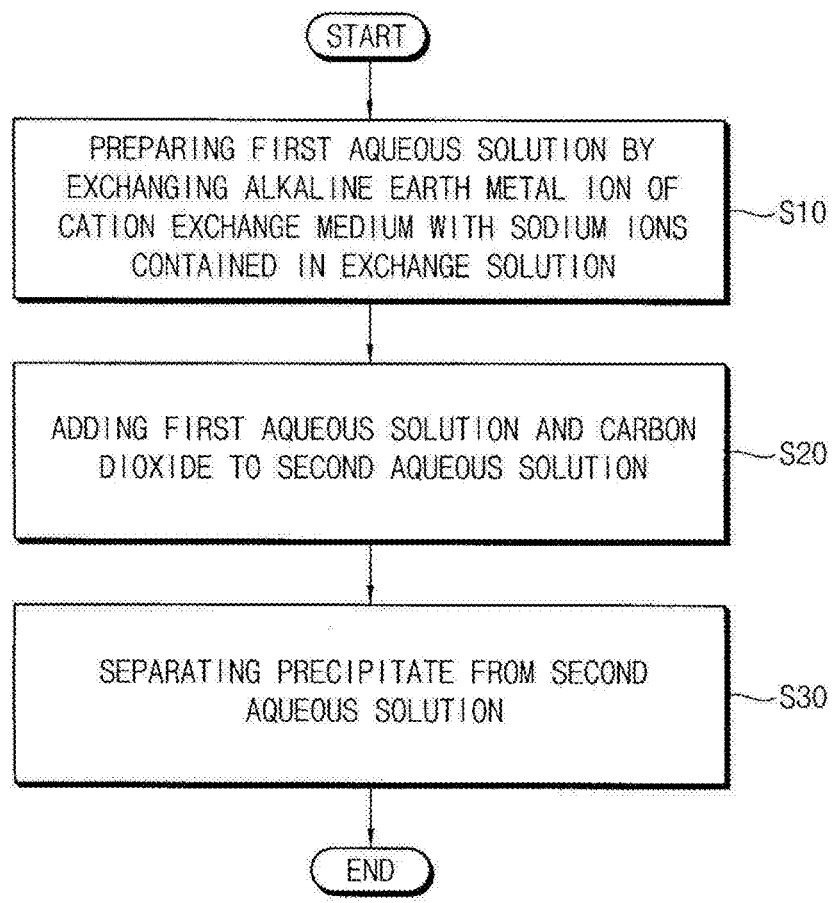
FIG. 1 is a flow-chart illustrating a method of producing carbonate minerals in accordance with example embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on", "connected to" or "bonded to" another element or layer, it can be directly on, connected or bonded to the other element or layer or intervening elements or layers may be present. In contrast, when an element is referred to as being "directly on," "directly connected to" or "directly bonded to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Methods of Producing Carbonate Minerals

According to methods of producing carbonate minerals in accordance with example embodiments of the present invention, first aqueous solution containing alkaline earth metal ions and carbon dioxide ($CO_2$) are provided to second aqueous solution so that carbonate minerals may be formed in the second aqueous solution. For example, in the second aqueous solution, the carbonate dioxide may form carbonate ion ($CO_3^{2-}$), the alkaline earth metal ions in the first aqueous solution may react with the carbonate ion ($CO_3^{2-}$) to form the carbonate minerals. The alkaline earth metal ions in the first aqueous solution may be extracted from a cation exchange medium by the cation exchange reaction. The cation exchange medium may include at least one of a clay mineral, a zeolite, an iron or manganese oxide, an iron or manganese hydroxide, and an organic ion exchange resin, each of which contain the alkaline earth metal. The clay mineral may include vermiculite, smectite, etc. The alkaline earth metal ions may include a calcium ion ($Ca^{2+}$), a magnesium ion ($Mg^{2+}$), etc.

Figure 2:
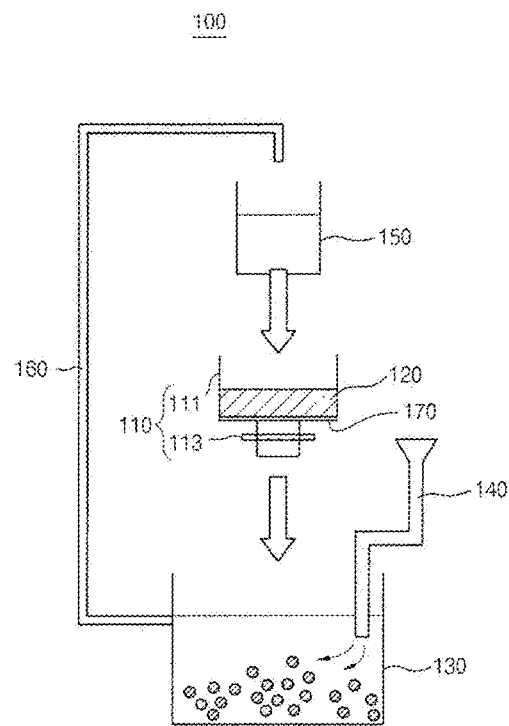
FIG. 2 is a view illustrating an apparatus of producing the carbonate minerals in accordance with example embodiments of the present invention.
Figure 3:
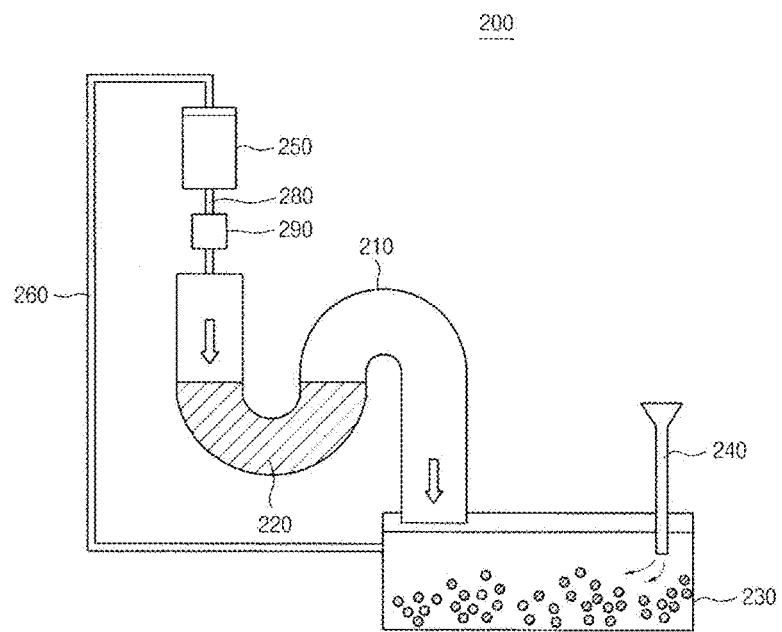
FIG. 3 is a view illustrating an apparatus of producing the carbonate minerals in accordance with example embodiments of the present invention.
Figure 4:
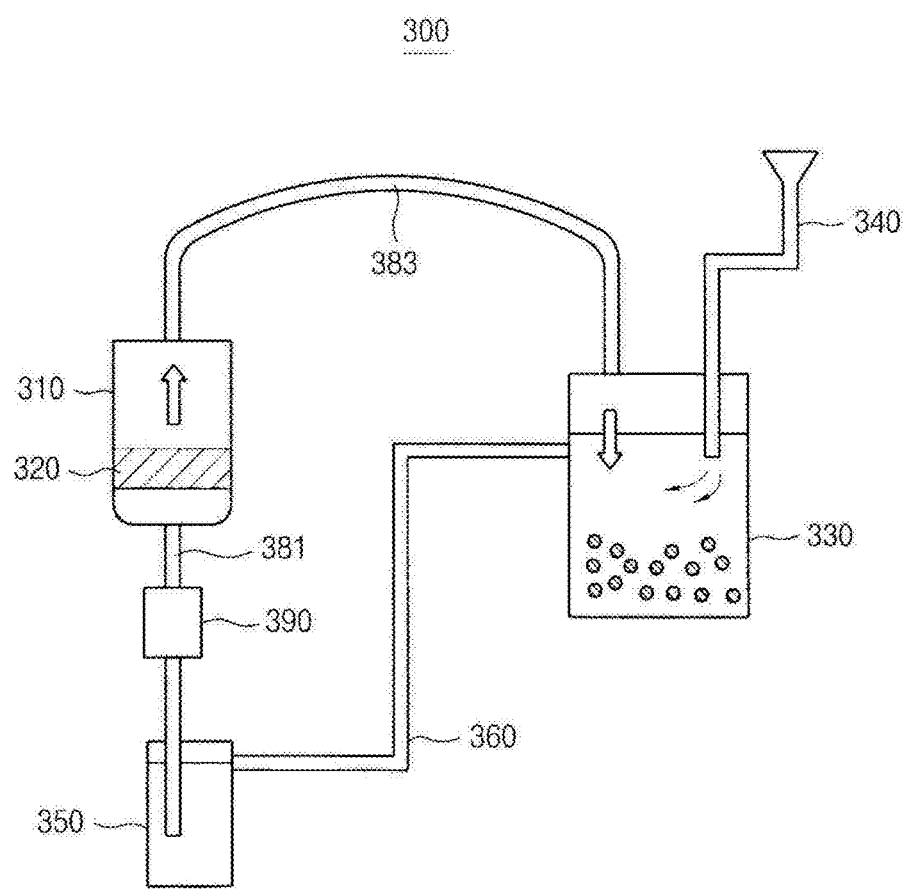
FIG. 4 is a view illustrating an apparatus of producing the carbonate minerals in accordance with example embodiments of the present invention.

FIG. 1 is a flow-chart illustrating a method of producing carbonate minerals in accordance with example embodiments of the present invention. FIG. 2 is a view illustrating an apparatus of producing the carbonate minerals in accordance with example embodiments of the present invention, FIG. 3 is a view illustrating an apparatus of producing the carbonate minerals in accordance with example embodiments of the present invention, and FIG. 4 is a view illustrating an apparatus of producing the carbonate minerals in accordance with example embodiments of the present invention.

Referring to FIGS. 1 to 4, in order to produce the carbonate minerals, ion exchange solution containing sodium ions ($Na^+$) may move along a fluid path of a cation exchange reaction device 110, 210 and 310 (Step 10). The ion exchange solution may meet the cation exchange medium 120, 220 and 320 disposed in the fluid path.

The ion exchange solution may contain components which are highly soluble in the solvent of the ion exchange solution and have low reactivity with the alkaline earth metal ions. In an example embodiment of the present invention, the ion exchange solution may contain sodium ions ($Na^+$) and chloride ions ($Cl^-$). For example, the ion exchange solution may be sodium chloride (NaCl) aqueous solution. Seawater may be used as the sodium chloride aqueous solution. In another example embodiment of the present invention, the ion exchange solution may contain sodium ions ($Na^+$) and nitrate ions ($NO_3^-$). For example, the ion exchange solution may be sodium nitrate ($NaNO_3$) aqueous solution.

When the ion exchange solution moving along the fluid path of the cation exchange reaction device 110, 210 and 310 meets the cation exchange medium 120, 220 and 320 disposed in the fluid path, the alkaline earth metal contained in the cation exchange medium 120, 220 and 320 may be exchanged with the sodium ions contained in the ion exchange solution, so that the ion exchange solution may contain the alkaline earth metal ions. In order to increase the contact area of the ion exchange solution and the cation exchange medium 120, 220 and 320, the cation exchange medium 120, 220 and 320 may include a plurality of stacked particles having sizes which are in a predetermined range. For example, the cation exchange medium 120, 220 and 320 including the stacked particles at a predetermined thickness may be disposed in the fluid path such that at least a portion of a cross section of the fluid path may be blocked by the cation exchange medium 120, 220 and 320. The alkaline earth metal exchanged by the sodium ions may include alkaline earth metal strongly combined with another atom in a crystal of the mineral particle used as the cation exchange medium 120, 220 and 320 and alkaline earth metal weakly combined to or absorbed onto an external surface of the mineral particle, a pore of the mineral particle, an interformational of the mineral particle, etc. The alkaline earth metal exchanged by the sodium ion may be mostly the alkaline earth metal weakly combined to or absorbed onto an external surface of the mineral particle, a pore of the mineral particle, an interformational of the mineral particle, etc. In order to induce an effective cation exchange reaction of the sodium ions and the alkaline earth metal ions, the particles of the cation exchange medium 120, 220 and 320 may have an average size of dozens micrometers to several centimeters. If the average size of the particles is too small, complex and difficult processes for preparing the particles may be required and the ion exchange solution may hardly pass through the cation exchange medium 120, 220 and 320. If the average size of the particles is too large, many of the alkaline earth metals weakly combined to or absorbed onto the pore of the mineral particle and the interformational of the mineral particle may not meet the ion exchange solution so that the number of the alkaline earth metals exchanged by the sodium ions may be decreased. The ion exchange solution passing through the fluid path of the cation exchange reaction device 110, 210 and 310 may contain the alkaline earth metal ions by the cation exchange reaction between the sodium ions and the alkaline earth metal ions.

For example, when the vermiculite is used as the cation exchange medium 120, 220 and 320 and the sodium chloride aqueous solution is used as the ion exchange solution, the cation exchange reaction as described in 'Chemical formula 1' may occur. The vermiculite may be the clay mineral formed from biotite, phlogopite, etc. by weathering. It has been known that the vermiculite has a cation exchange capacity of about 100 to about 150 cmol/kg. Calcium ion of about 20 to about 30 Kg may be eluted from vermiculite of 1 ton by the cation exchange reaction described above. Therefore, when carcite is formed using the vermiculite, the calcite of about 90 to 130 Kg may be produced from the vermiculite of about 1 ton.

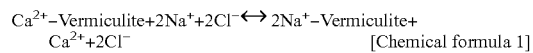
[Chemical formula 1]

Hereinafter, the ion exchange solution passing through the fluid path of the cation exchange reaction device 110, 210 and 310 will be referred to as 'first solution' which contains the alkaline earth metal ions. The first solution is distinguished from the ion exchange solution not passing through the fluid path, which does not contain the alkaline earth metal ions.

Then, the first solution and the carbon dioxide may be added to second solution accommodated in a precipitation reaction device 130, 230 and 330 (Step 20).

For the precipitation of the carbonate minerals described below, the second solution may be alkaline solution. In an example embodiment of the present invention, the second solution may be aqueous solution containing sodium ion ($Na^+$) and hydroxyl ion ($OH^-$). For example, the second solution may be sodium hydroxide (NaOH) aqueous solution.

The carbon dioxide added to the second solution may react with water ($H_2O$) of the second solution to produce the carbonate ion ($CO_3^{2-}$) and hydrogen ion ($H^+$) as described in 'Chemical formula 2'. The hydrogen ion ($H^+$) may react with the hydroxyl ion ($OH^-$) to produce water ($H_2O$) as described in 'Chemical formula 3'. As the carbonate minerals are precipitated in the second solution, the alkalinity of the second solution may be decreased by the neutralization reaction described in 'Chemical formula 3'. In order to maintain the alkalinity of the second solution required for the precipitation of the carbonate minerals, the second solution may be properly provided with sodium hydroxide.

[Chemical formula 2]

[Chemical formula 3]

The carbonate minerals may be precipitated in the second solution provided with the first solution and the carbon dioxide. The carbonate minerals may include $CaCO_3(s)$, $MgCO_3(s)$, $(Ca, Mg)CO_3 (s)$, etc. For example, when the alkaline earth metal ions are calcium ions ($Ca^{2+}$), a chemical reaction as described in 'Chemical formula 4' may be occurred in the second solution.

[Chemical formula 4]

When the carbon dioxide starts to be added to the second solution at a first time, the first solution may start to be added to the second solution within a time period from a time earlier than the first time by a first predetermined time and a time later than the first time by a second predetermined time. The first and second predetermined time may be about ten minutes. For example, the first solution may starts to be added to the second solution simultaneously with the carbon dioxide. With respect to the first time when the carbon dioxide starts to be added to the second solution, if the first solution starts to be added to the second solution excessively early, the alkaline earth metal ions contained in the first solution may react with the hydroxide ions contained in the second solution to form alkaline earth metal hydroxide in the second solution. For example, when the second solution, which is sodium hydroxide aqueous solution not containing the carbonate ion ($CO_3^{2-}$), is provided with the first solution containing the calcium ions, the calcium ions may react with the hydroxide ions to form calcium hydroxide precipitate in the second solution as described in 'Chemical formula 5', so that the concentration of the calcium ions reacting with the carbonate ions may be decreased in the second solution. With respect to the first time when the carbon dioxide starts to be added to the second solution, if the first solution starts to be added to the second solution excessively late, the hydrogen ions and the carbonate ions which are generated according to 'Chemical formula 2' may react with each other to form bicarbonate ions ($HCO_3^-$) described in 'Chemical formula 6', so that the concentration of the carbonate ions reacting with the alkaline earth metal ions may be decreased in the second solution.

[Chemical formula 5]

[Chemical formula 6]

Then, the carbonate precipitate may be separated from the second solution in the precipitation reaction device 130, 230 and 330 (Step 30). The separated carbonate precipitate may be used as raw materials for industry.

When the carbonate precipitate has been separated from the second solution, the second solution contains a lot of sodium ions, similar to the ion exchange solution. Therefore, the second solution may be reused as the ion exchange solution.

Figure 5:
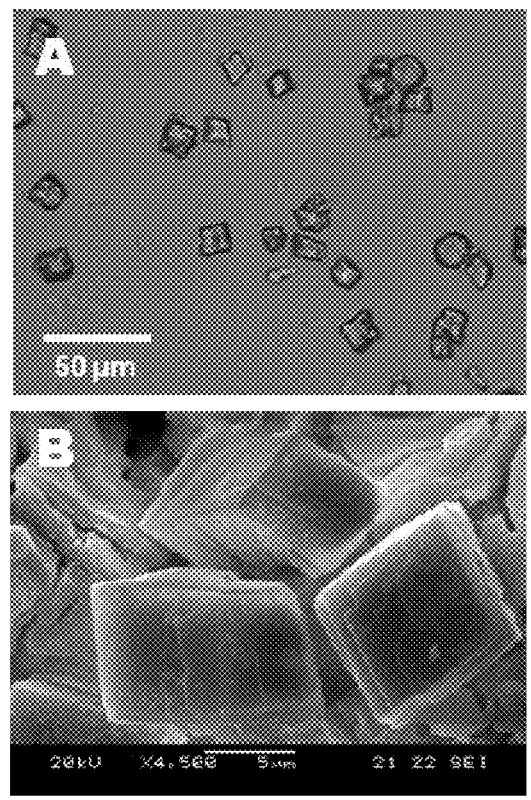
FIG. 5 is a photomicrograph and a SEM (Scanning Electron Microscope) image illustrating the carbonate minerals produced using vermiculite.
Figure 6:
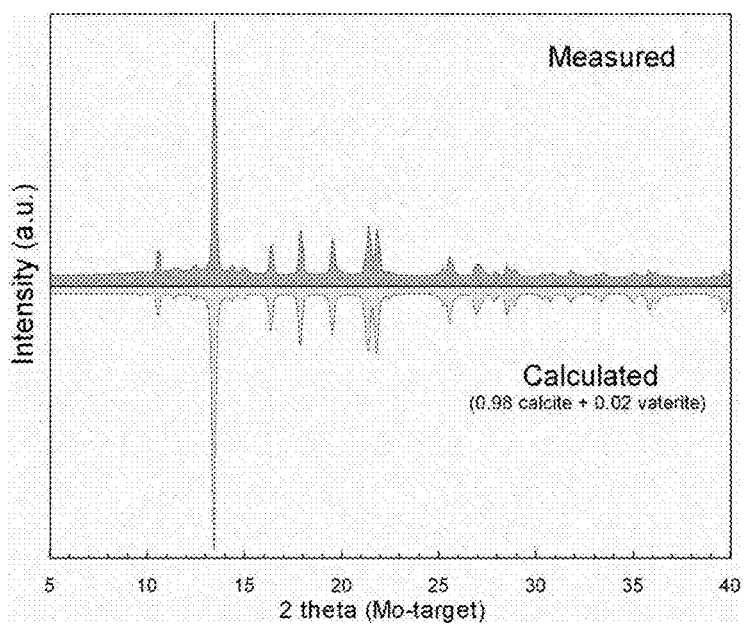
FIG. 6 is a graph illustrating a result of X-ray diffraction analysis of the carbonate mineral shown in FIG. 5.

FIG. 5 is a photomicrograph and a SEM (Scanning Electron Microscope) image illustrating the carbonate minerals produced using vermiculite and FIG. 6 is a graph Illustrating a result of X-ray diffraction (XRD) analysis of the carbonate mineral shown in FIG. 5.

Referring to FIGS. 5 and 6, the carbonate minerals were formed using the vermiculite as the cation exchange medium in accordance with example embodiments of the present invention described above. FIGS. 5 and 6 verify that methods of producing carbonate minerals in accordance with example embodiments of the present invention can effectively convert the carbon dioxide into carbonate minerals. Referring to the result of the XRD analysis shown in FIG. 6, the carbonate minerals are composed of calcite of about 98 wt. % and vaterite of about 2 wt. %. The vaterite is a polymorph of the calcite. In FIG. 6, the upper graph indicates data measured using Mo-target (wavelength=0.7093 Å) and the lower graph indicates data calculated using PDF materials of the calcite (PDF#47-1743) and the vaterite (PDF#33-268).

According to the methods of producing the carbonate minerals in accordance with example embodiments of the present invention, the processes described above may be repetitively performed to continuously form the carbonate minerals. As a result, the methods of producing the carbonate minerals in accordance with example embodiments of the present invention may perform continuous sequestration of the carbon dioxides. In addition, the carbonate minerals produced by the methods in accordance with example embodiments of the present invention may be used as raw materials for industry.

Apparatuses of Producing Carbonate Minerals

FIG. 2 is a view illustrating an apparatus of producing the carbonate minerals in accordance with example embodiments of the present invention.

Referring to FIG. 2, an apparatus 100 of producing the carbonate minerals in accordance with example embodiments of the present invention may include a first reaction device 110, a cation exchange medium 120, a permeable membrane 170, a second reaction device 130 and a carbon dioxide supplying device 140.

The first reaction device 110 may include a reaction tube 111 and a valve 113. The reaction tube 111 may include a fluid path along which ion exchange solution moves. The valve 113 may control the flow velocity of the ion exchange solution moving along the fluid path. The fluid path may pass through the reaction tube 111 and may include an inlet receiving the ion exchange solution supplied from the outside and an outlet discharging the ion exchange solution containing alkaline earth metal ions generated by a cation exchange reaction. The valve 113 may be combined with the outlet and may control the flow velocity of the ion exchange solution moving along the fluid path. The ion exchange solution may contain components which are highly soluble in the solvent of the ion exchange solution and have low reactivity with the alkaline earth metal ion. For example, the ion exchange solution may be sodium chloride (NaCl) aqueous solution or sodium nitrate ($NaNO_3$) aqueous solution.

The cation exchange medium 120 may be disposed in the fluid path of the first to reaction device 110 and may contain an alkaline earth metal. The ion of the alkaline earth metal may include a calcium ion ($Ca^{2+}$), a magnesium ion ($Mg^{2+}$), etc. The cation exchange medium 120 may include at least one of a clay mineral, a zeolite, an iron or manganese oxide, an iron or manganese hydroxide, and an organic ion exchange resin, which contain the alkaline earth metal. The clay mineral may include Vermiculite, Smetite, etc. In order to increase the contact area of the ion exchange solution and the cation exchange medium 120, the cation exchange medium 120 may include a plurality of stacked particles having sizes in a predetermined range. For example, the cation exchange medium 120 including the stacked particles at a predetermined thickness may be disposed in the fluid path such that at least a portion of a cross section of the fluid path may be blocked by the cation exchange medium 120. When the ion exchange solution moves along the fluid path, the alkaline earth metal ion contained in the cation exchange medium 120 may be exchanged by the sodium ion contained in the ion exchange solution. Thus, the ion exchange solution having passed through the fluid path may contain the alkaline earth metal ions through the cation exchange reaction described above. The alkaline earth metals exchanged by the sodium ions may include an alkaline earth metal strongly combined with another atom in a crystal of the mineral particle used as the cation exchange medium 120 and an alkaline earth metal weakly combined to or absorbed onto an external surface of the mineral particle, a pore of the mineral particle, an interformational of the mineral particle, etc. The alkaline earth metal exchanged by the sodium ion may be mostly the alkaline earth metal weakly combined to or absorbed onto an external surface of the mineral particle, a pore of the mineral particle, an interformational of the mineral particle, etc.

The permeable membrane 170 may be disposed in the fluid path to support the cation exchange medium 120. The ion exchange solution penetrates the permeable membrane 170 but the particles of the cation exchange medium 120 cannot penetrate the permeable membrane 170 to prevent the particles of the cation exchange medium 120 from being discharged from the reaction tube 111.

The second reaction device 130 may be a container capable of accommodating sodium hydroxide aqueous solution. The second reaction device 130 accommodating the sodium hydroxide aqueous solution may be provided with the ion exchange solution having passed through the fluid path of the first reaction device 110.

The carbon dioxide supplying device 140 may supply the sodium hydroxide aqueous solution accommodated by the second reaction device 130 with the carbon dioxide.

When the ion exchange solution containing the alkaline earth metal ions and the carbon dioxide are supplied to the sodium hydroxide aqueous solution accommodated by the second reaction device 130, carbonate minerals may be precipitated in the sodium hydroxide aqueous solution. The precipitated carbonate minerals may include $CaCO_3(s)$, $MgCO_3(s)$, $(Ca,Mg)CO_3(s)$, etc.

The apparatus 100 of producing the carbonate minerals may further include a first container 150 and a solution rotation device 160.

The first container 140 may accommodate the ion exchange solution. The ion exchange solution accommodated by the first container 140 may be supplied to the fluid path of the first reaction device 110. The solution rotation device 160 may supply the first container 140 with a solution accommodated in the second reaction device 130. After the precipitated carbonate minerals are separated from the second solution, the second solution remaining in the second reaction device 130 may contain abundant sodium ions, similar to the ion exchange solution. Therefore, the second solution remaining in the second reaction device 130 may be reused as the ion exchange solution. In order to reuse the second solution remaining in the second reaction device 130 as the ion exchange solution, the solution rotation device 160 may be connected to the first container 140 and the second reaction device 130 to transfer the second solution remaining in the second reaction device 130 from the second reaction device 130 to the first container 140.

Although FIG. 2 shows the solution rotation device 160 directly connected to the second reaction device 130, the apparatus 100 may further include a second container (not shown) accommodating the second solution from which the precipitated carbonate minerals have been separated and the solution rotation device 160 may be connected to the second container to transfer the second solution accommodated by the second container from the second container to the first container 140.

FIG. 3 is a view illustrating an apparatus of producing the carbonate minerals in accordance with example embodiments of the present invention.

Referring to FIG. 3, an apparatus 200 of producing the carbonate minerals in accordance with example embodiments of the present invention may include a first reaction device 210, a cation exchange medium 220, a second reaction device 230, a carbon dioxide supplying device 240, a first container 250, a solution rotation device 260, a connection tube 280, and a pump 290.

The cation exchange medium 220, the second reaction device 230, the carbon dioxide supplying device 240, the first container 250, and the solution rotation device 260 may be substantially the same as or similar to corresponding components of the apparatus 100 described in FIG. 2. Thus, any repetitive explanation concerning the cation exchange medium 220, the second reaction device 230, the carbon dioxide supplying device 240, the first container 250, and the solution rotation device 260 will be omitted and the first container 250, the connection tube 280 and the pump 290 will be mainly explained below.

The first reaction device 210 may have a structure for preventing the particles of the cation exchange medium 220 from being discharged from the first reaction device 210. For example, the first reaction device 210 may include a fluid path. The fluid path of the first reaction device 210 may include a first curved portion which is downwardly curved, a second curved portion which is upwardly curved, a receiving portion which is connected to a first end of the first curved portion and receives the ion exchange solution from the first container 250 through the connection tube 280, a connection portion which connects a second end of the first curved portion with a first end of the second curved portion, and a discharging portion which is connected to a second end of the second curved portion and discharges the ion exchange solution containing the alkaline earth metal ions into the second reaction device 230. The particles of the cation exchange medium 220 may be disposed in the first curved portion. The apparatus 200 does not include the permeable membrane 170 for preventing the particles of the cation exchange medium 220 from being discharged from the fluid path. However, the second curved portion may prevent the particles disposed in the first curved portion from being discharged from the fluid path.

The connection tube 280 may connect the first container 250 with the fluid path of the first reaction device 210. The connection tube 280 may include a fluid path along which the ion exchange solution moves.

The pump 290 may be combined with the connection tube 280 to supply the ion exchange solution accommodated by the first container 250 to the fluid path of the first reaction device 210. The pump 290 may control an amount and a flow velocity of the ion exchange solution supplied to the first reaction device 210, so that a flow velocity of the ion exchange solution moving along the fluid path of the first reaction device 210 may be controlled by the pump 290. Therefore, the pump 290 may improve the efficiency of the cation exchange reaction occurring in the first reaction device 210.

FIG. 4 is a view illustrating an apparatus of producing the carbonate minerals in accordance with example embodiments of the present invention.

Referring to FIG. 4, an apparatus 300 of producing the carbonate minerals in accordance with example embodiments of the present invention may include a first reaction device 310, a cation exchange medium 320, a second reaction device 330, a carbon dioxide supplying device 340, a first container 350, a solution rotation device 360, a connection tube 381, a second connection tube 383 and a pump 390.

The first reaction device 310, the cation exchange medium 320, the second reaction device 330, the carbon dioxide supplying device 340, the first container 350, and the solution rotation device 360 may be substantially the same as or similar to corresponding components of the apparatuses 100 and 200 described in FIGS. 2 and 3. Thus, any repetitive explanation concerning the first reaction device 310, the cation exchange medium 320, the second reaction device 330, the carbon dioxide supplying device 340, the first container 350, and the solution rotation device 360 will be omitted and the first connection tube 381, the second connection tube 383, and the pump 390 will be mainly explained below.

The first connection tube 381 may connect the first container 350 with the fluid path of the first reaction device 310 and may include fluid path along which the ion exchange solution moves.

The pump 390 may be combined with the first connection tube 381 to supply the ion exchange solution accommodated by the first container 350 to the fluid path of the first reaction device 310. Since the ion exchange solution is supplied to the first reaction device 310 by the pump 390, the ion exchange solution can move against the gravitation. As a result, the air contained in the cation exchange medium 320 may be effectively removed by the ion exchange solution moving against the gravitation. In addition, the pump may control the flow velocity of the ion exchange solution moving along the fluid path of the first reaction device 310. Therefore, the pump 390 may improve the efficiency of the cation exchange reaction occurring in the first reaction device 310.

The second connection tube 383 may connect the fluid path of the first reaction device 310 with the second reaction device 330 to supply the ion exchange solution discharged from the first reaction device 310 to the second reaction device 330. When the first connection tube 381, the first reaction device 310, the second connection tube 383, the second reaction device 330, and the solution rotation device 360 may form a single hermetic fluid path, the pump 390 may control the amount and the flow velocity of the ion exchange solution moving the single hermetic fluid path. Therefore, the apparatus 300 may continuously perform processes for producing the carbonate minerals.

Alternatively, although not shown in FIG. 4, the apparatus 300 may further include another pump (not shown) connected to the solution rotation device 360. The pump connected to the solution rotation device 360 may independently control the amount of the solution transferred from the second reaction device 330 to the first container 350.

According to example embodiments of the present invention, since the carbonate minerals are formed using the alkaline earth metal weakly combined to or absorbed onto an external surface of the mineral particle, a pore of the mineral particle, an interformational of the mineral particle, etc., energy for producing the carbonate minerals may be reduced and the carbon dioxide may be quickly converted into the carbonate minerals. Since the example embodiments of the present invention produce the carbonate minerals without dissolving a mineral particle used as the cation exchange medium, it may be prevented that the mineral particle used as the cation exchange medium is coated by the alkaline earth metal carbonate.

In addition, example embodiments of the present invention use the vermiculite, the smectite and the zeolite as the cation exchange medium. Although the vermiculite, the smectite and the zeolite are abundant, they hardly have industrial applications. Therefore, example embodiments of the present invention may make the industrial applications of the vermiculite, the smectite and the zeolite and may be capable of sequestering the carbon dioxide cheaply.

In addition, since example embodiments of the present invention extract the alkaline earth metal ion from the cation exchange medium without destroying the crystal structure of the cation exchange medium, the example embodiments of the present invention does not waste the mineral used as the cation exchange medium. Since example embodiments of the present invention form the carbonate minerals without addition of anions, example embodiments of the present invention may form pure carbonate minerals. The pure carbonate minerals may be used as raw materials of industry, such as paper coating materials, fire-proofing materials, etc.

In addition, the apparatus of producing the carbonate minerals in accordance with example embodiments of the present invention is capable of being fabricated in a small-to-medium scale, the apparatus may be placed in industrial settings or houses to directly sequester the carbon dioxide generated in the industrial settings or the houses.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An apparatus of producing a carbonate mineral, comprising:
   a first reaction device including a fluid path along which an ion exchange solution moves;
   a cation exchange medium disposed in the fluid path, the cation exchange medium containing an alkaline earth metal;
   a second reaction device accommodating a sodium hydroxide aqueous solution and receiving the ion exchange solution containing ions of the alkaline earth metal from the first reaction device; and
   a carbon dioxide supplying device supplying a carbon dioxide to the sodium hydroxide aqueous solution,
   wherein the ion exchange solution comprises cations exchanged with the ions of the alkaline earth metal, and the ions of the alkaline earth metal react with carbonate ions to form the carbonate minerals within the second reaction device.

2. The apparatus of claim 1,
   wherein the first reaction device comprises a reaction tube extending in one direction, through which the ion exchange solution passes and in which the cation exchange medium disposed.

3. The apparatus of claim 2,
   wherein the cation exchange medium comprises a plurality of stacked powders comprising the alkaline earth metal and filling a portion of the reaction tube, and
   wherein each of the powders comprises at least one of a clay mineral, a zeolite, an iron or manganese oxide, an iron or manganese hydroxide, and an organic ion exchange resin.

4. The apparatus of claim 3, wherein the first reaction device further comprises a permeable membrane disposed in the reaction tube, the permeable membrane preventing the powders escaping from the reaction tube.

5. The apparatus of claim 2, further comprising:
a first container accommodating the ion exchange solution;
a first connection tube connecting the first container and the reaction; and
a solution rotation tube connecting the second reaction device and the first container,
wherein the ion exchange solution accommodated in the first container moves to the reaction tube through the first connection tube and the solution accommodated in the second reaction device after formation of the carbonate mineral moves to the first container through the solution rotation tube.

6. The apparatus of claim 5, wherein an inlet of the reaction tube is positioned over an outlet of the reaction tube, and the first reaction device further comprises a valve combined with the outlet of the reaction tube to control amount of the ion exchange solution passing through the reaction tube.

7. The apparatus of claim 5, further comprising:
a pump combined with the first connection tube to pump up the ion exchange solution from the first container to the reaction tube,
wherein an inlet of the reaction tube is positioned under an outlet of the reaction tube.

8. The apparatus of claim 7, further comprising:
a second connection tube connecting the reaction tube with the second reaction device.

9. The apparatus of claim 1, wherein the first reaction device comprises a reaction tube in which the cation exchange medium disposed and the ion exchange solution passes through, the reaction tube comprising a plurality of curved portions.

10. The apparatus of claim 9, wherein the reaction tube comprises:
a first curved portion downwardly curved;
a second curved portion upwardly curved, the second curved portion comprising one end portion connected to one end portion of the first curved portion;
a receiving portion upwardly extending from the other end portion of the first curved portion and comprising an Inlet of the reaction tube; and
a discharging portion downwardly extending from the other end portion of the second curved portion and comprising an outlet of the reaction tube.

11. The apparatus of claim 10, wherein the cation exchange medium comprises a plurality of powders stacked in the first curved portion, and each of the powders comprises at least one of a clay mineral, a zeolite, an iron or manganese oxide, an iron or manganese hydroxide, and an organic ion exchange resin.

12. The apparatus of claim 10, further comprising:
a first container accommodating the ion exchange solution;
a first connection tube connecting the first container and the reaction; and
a pump combined with the first connection tube to pump up the ion exchange solution from the first container to the reaction tube,
wherein the ion exchange solution accommodated in the first container moves to the reaction tube through the first connection tube.

13. The apparatus of claim 1, wherein the ion exchange solution comprises a sodium chloride aqueous solution.

* * * * *